United States Patent [19]

Quillevere et al.

[11] 4,300,936
[45] Nov. 17, 1981

[54] PROCESS OF COOLING GLASS IN A FLUIDIZED BED

[75] Inventors: Jean C. Quillevere, Sainte Geneviève des Bois; Jean Segall, Paris, both of France

[73] Assignee: BFG Glassgroup, Paris, France

[21] Appl. No.: 52,393

[22] Filed: Jun. 27, 1979

[30] Foreign Application Priority Data

Jul. 21, 1978 [LU] Luxembourg .......................... 80019

[51] Int. Cl.$^3$ .......................................... C03B 27/00
[52] U.S. Cl. ..................................... 65/114; 65/111; 165/104.16
[58] Field of Search ..................... 65/104, 114, 111; 165/104 M, 104 F, 104 R

[56] References Cited

U.S. PATENT DOCUMENTS

| | | | |
|---|---|---|---|
| 3,423,198 | 1/1969 | McMaster et al. | 65/114 X |
| 4,066,430 | 1/1978 | Franz | 65/114 X |
| 4,111,675 | 9/1978 | Ballard | 65/114 |
| 4,113,458 | 9/1978 | Cross | 65/114 |

FOREIGN PATENT DOCUMENTS 1537639 1/1979 United Kingdom .

OTHER PUBLICATIONS

CRC Handbook of Chemistry and Physics, 59th Edition, R. C. Weast, CRC Press Inc., pp. B-91-B-92.
Advanced Inorganic Chemistry, by F. A. Cotton et al., 2nd revised edition, John Wiley & Sons, 1966, p. 439.
"Annealing & Fluidized-Bed Quenching of Nimonic-Alloy Sheet", Astley et al., Sheet Metal Industries, Sep. 1962, pp. 601-608.
Comprehensive Inorganic Chemistry, Pergamon Press, pp. 1032-1036, "Oxides & Hydroxides".

*Primary Examiner*—Arthur D. Kellogg
*Attorney, Agent, or Firm*—Spencer & Kaye

[57] ABSTRACT

A process for rapid and uniform cooling of glass comprising introducing it into a fluidized bed of particles under conditions such that heat is transferred from the glass to the fluidized material. The fluidized material comprises particles which can be caused to undergo endothermic change by heating them to a temperature lower than the temperature of the glass as it enters the fluidized bed.

21 Claims, 2 Drawing Figures

PROCESS OF COOLING GLASS IN A FLUIDIZED BED

BACKGROUND OF THE INVENTION

This invention relates to a process of cooling glass by introducing it into a fluidised bed of particles under thermal conditions such that heat is transferred from the glass to the fluidised material.

The invention has been made in the course of attempts to solve problems encountered in the thermal tempering of glass sheets and will hereafter be more particularly described in that context. The invention is however not restricted to a thermal tempering process.

The thermal tempering of glass involves rapid cooling of the glass from a temperature above its strain point usually a temperature near its softening point. The surface layers of the glass are cooled more quickly than the internal layers with the consequence that the surface layers become subjected to compressive stresses balanced by tensile stresses in the internal layers.

A long established cooling process employs cooling air streams which are directed against the face of the glass. Problems arise when using this process in the tempering of some thin glass sheets, e.g., sheets of ordinary soda-lime glass less than 3 mm in thickness. In particular the extraction of heat from the surface layers of glass at a rate sufficient to establish the required stress gradient within the thickness of the glass sheets necessitates impingement of cooling air against the very hot glass at a flow rate which under those thermal conditions tends to deform the thin glass sheets and/or to spoil the faces of the glass. Such defects may render the sheets unusable for their intended purpose and they certainly do so in the event that high quality optical and other specifications are demanded, as for example in the manufacture of some vehicle windows such as automobile windscreens.

In the glass industry interest has in recent years been shown in the use of fluidised beds of particulate material for effecting the rapid cooling of glass sheets which is required for tempering purposes. This interest is explained by the large heat exchange coefficients which such fluidised beds can have.

One of the factors which influences the rate of heat exchange between a hot glass sheet and the particles of a fluidised bed into which the glass sheet is immersed is the velocity of the fluidising gas stream.

The rate of heat exchange increases with increase in the gas velocity because of the higher mobility of the fluidised particles. However, the more the fluidising gas velocity is increased the more risk is there of the quality of the glass article being impaired. There are a number of factors which can give rise to this risk, one of them being differences in conditions from one zone to another in the fluidised bed, e.g. because of bubble formation. The adverse effects on the glass article may be deformation of its shape and/or impairment of its surface. The risk of deformation is particularly present when treating thin glass. When using a fluidised bed for cooling glass through its strain point and sufficiently rapidly to effect thermal tempering, any lack of uniformity of conditions within the fluidised bed is liable to lead to non-uniform tempering of the glass.

SUMMARY OF THE INVENTION

It is an object of this invention to provide a process whereby cooling which is both rapid and uniform can be more easily effected.

According to the present invention there is provided a process of cooling glass by introducing it into a fluidised bed of particles under thermal conditions such that heat is transferred from the glass to the fluidised material, characterised in that the fluidised material consists of or includes particles which can be caused to undergo endothermic change by heating them to a temperature lower than the temperature of the glass as it enters the fluidised bed.

DETAILED DESCRIPTION OF THE INVENTION

Figure 1:
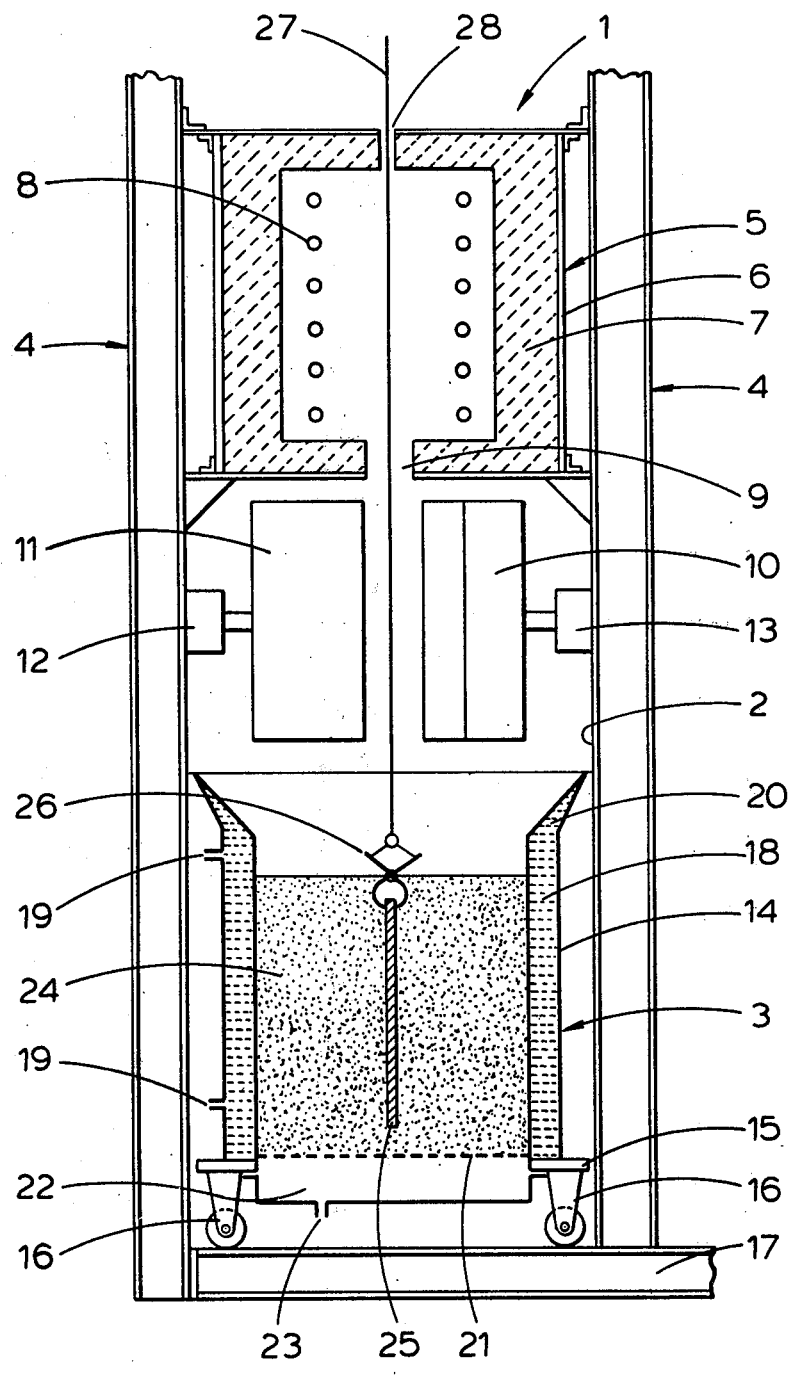
FIG. 1 is a diagrammitic representation of an installation for bending and thermally tempering glass sheets and incorporating a fluidisation apparatus according to the invention.

Tests indicate that when using the fluidised particles according to the present invention the fluidising gas velocity can be lower than it would otherwise require to be for achieving a given cooling rate. In consequence it is easier to achieve uniform cooling of a glass article at a given cooling rate. This is particularly important when subjecting glass to thermal tempering, and most of all when thermally tempering thin glass articles, e.g. glass sheets 3 mm or less in thickness. For example when tempering sheets of glass for use in vehicle windows and in particular automobile windscreens, the breakage characteristics of the glass should satisfy a recognised standard (referred to in more detail hereafter). This cannot be achieved unless the cooling of the glass is effected with a high standard of uniformity.

The possibility of working with lower fluidising gas velocities affords the further advantage that energy consumption can be reduced. In addition of course the consumption of gas can be reduced, which is of importance when using a gas other than air for fluidising the particles.

Preferably all or most of the fluidised particles in the bed are particles which on being caused to undergo endothermic change as above specified, leave a particulate residue.

In preferred processes according to the invention at least a part of the total quantity of fluidised particles are composed of material which contains hydroxyl groups and/or water and which can lose at least some of such groups and/or water endothermically at a temperature below the said entry temperature of the glass. Suitable fluidised materials on this category are readily available which would be capable of undergoing endothermic change within the fluidised bed itself without entailing such modifications of the fluidised particles according to the present invention or of the fluidising gas as to give rise to problems in controlling the thermal treatment of the glass. In general such materials, which include both organic and inorganic compounds, are very suitable for use with air as the fluidising gas.

Fluidised particles which are capable of losing water at a temperature below the temperature of the glass on entry into the fluidised bed include particles of substances containing water of constitution and particles containing adsorbed or absorbed water.

In some embodiments of the invention use is made of fluidised particles which are constituted by an inorganic compound containing hydroxyl groups and/or containing water of constitution. Compounds in the latter category include, for example, hydrated salts. Specific examples of such compounds which are very suitable are the α and γ species of the monohydrate of iron sesquioxide $Fe_2O_3.H_2O$.

A particularly advantageous compound for forming particles of the fluidised bed is trihydrated alumina, $Al_2O_3.3H_2O$, which may be used e.g. either in the form of hydrargillite which loses its water at about 140° C. at normal pressure or bayerite which loses a large part of its water between 120° and 160° C. Trihydrated alumina is capable of undergoing endothermic change with appreciable take up of heat in a favourably low temperature range. Such material has been found particularly suitable for use in a process according to the invention for thermally tempering very thin glass sheets 3 mm or less in thickness. Such tempering can be effected using air as the fluidising gas. There is no need to employ a gas of special composition having a higher specific heat.

Examples of particles containing adsorbed or absorbed water which may be used in the formation of the fluidised bed are particles of moist silica or activated alumina which can contain up to 20 to 30% by weight of adsorbed or absorbed water. Another example is particles of silica gel containing absorbed water.

Water can be introduced into the fluidised bed at the commencement of the process and/or continuously or intermittently during the process. The water may be used for adsorption or absorption by the particles to compensate or partly to compensate for any loss of water from such particles under conditions reached in the fluidised bed.

The granulometry of the fluidised material is of importance for the heat transfer. Other things being equal the cooling of the glass will be more rapid according as use is made of smaller particles. However if the particles are too small they will tend to be carried off by the fluidising gas. The most suitable size range for the particles depends in part on the material composing the particles, in particular on its specific gravity. Generally speaking the best results are obtained when the fluidised material consists entirely or substantially entirely of particles in the size range 20 to 250 microns. When using particles in that range an heat exchange rate adequate for tempering thin glass sheets can be achieved using fluidised particles of many different compositions and without problems arising because of adhesion of particles to the glass when it is removed from the fluidised bed. The glass can be easily cleaned by blowing air across its faces.

When using trihydrated alumina as the fluidised material, the particles are preferably between 40 and 150 microns and most preferably between 40 and 120 microns in size. This size range has proved to be most favourable for promoting rapid cooling and preserving a high surface quality of the glass even when treating sheets of 3 mm or less in thickness.

It is convenient to use air as the fluidising gas in a process according to the invention. Other gases can of course be used if desired, e.g. helium, carbon dioxide or $SF_6$.

The advantages of uniformity of treatment which can be attained by using a process according to the invention are particularly marked when using a fluidising gas velocity only a little above the velocity which corresponds with the maximum expansion peak of the fluidised bed.

It is a characteristic phenomenon of particle fluidisation that during build up of gas pressure beneath a foraminous support of the particle bed, to bring the bed into a fluidised condition, the bed first undergoes expansion with consequent progressive increase in the height of the bed surface up to a certain level whereafter, as the gas pressure further increases, there is some fall in the level of the bed surface before the bed again undergoes expansion leading to the very turbulent so-called free-boiling state of the bed, and eventually at very high gas pressure to significant upward entrainment of particles from the bed. If the bed surface level is plotted graphically against rising gas pressure the initial expansion of the bed and the following partial collapse which occurs before expansion again takes place is manifest as an expansion peak.

In certain processes according to the invention, the fluidising gas velocity is above the value corresponding with the expansion peak on the bed height/gas velocity curve but is not more than 1.2 times that value. A process of cooling glass in a fluidised bed of particles using a fluidising gas velocity within that range is described and claimed in our co-pending patent application Ser. No. 052,392. By working within that gas velocity range particularly high standards of uniformity of the cooling can be attained. Preferably the fluidising gas velocity is at least 1.03 times the velocity corresponding with the fluidised bed expansion peak.

While a process according to the invention can be performed at gas velocities below the fluidised bed expansion peak the resistance of the fluidised bed to the entry of the article to be treated is greater. This is a disadvantage when treating articles which are particularly susceptible to damage in the temperature range of the treatment. A notable example is the tempering of glass sheets which have a thickness of 3 mm or less and which have a curvature such that they would be very liable to deformation if lowered into a fluidised bed offering a significant resistance to their movement.

Advantageously, the fluidised bed of particles is subjected to a vibratory movement of low amplitude, which assists in preventing agglomeration of fluidised particles. Other things being equal finer particles can in those circumstances be used. Furthermore, when subjecting the particles to vibratory movement a given treatment can be performed with a lower fluidising gas velocity, which is of benefit when treating glass articles which by virtue of their very high temperature or otherwise are particularly susceptible to damage. Preferably the vibration frequency is between 50 and 8,000 Hz. The vibratory movement can be brought about by a vibrator connected to the fluidisation vessel.

The process can be carried out in fluidisation apparatus as known per se and which basically comprises a fluidisation vessel having a foraminous floor or platform surmounting a pressure chamber from which gas is forced upwardly through that floor which latter ensures a substantially uniformly distributed flow of fluidising gas over the whole area of the fluidisation vessel. Preferably the foraminous floor is constituted by a porous wall.

It has been found that the advantages of the process are enhanced by using a porous wall with particularly small pores for distributing the fluidising gas. In preferred embodiments the pores are less than 60 microns in size. The presence of this condition enables a very stable fluidised bed to be maintained at lower fluidising gas velocities than would otherwise be required. The stability increases with reduction in the pore size. The best results are obtained when the pores are less than 10 microns in size and optimally the pores are less than 5 microns in size. The pore sizes are calculated from a capillary test.

Another factor which is of importance for the stability of the fluidised bed at any given fluidising gas velocity is the permeability of the porous wall. Preferably the permeability coefficient does not exceed $6 \times 10^{-11}$ m². The best results are obtained when the permeability coefficient is lower than $0.25 \times 10^{-11}$ m² and optimally the permeability coefficient is less than $0.05 \times 10^{-11}$ m². The permeability coefficient is determined from the volume flow rate of gas through the porous wall per square meter of wall area for a given pressure drop across the wall according to the equation:

$$\text{Flow rate/m}^2 = p_o \frac{P_2 - P_1}{t \cdot \mu}$$

where $p_o$ is the permeability coefficient, $P_2 - P_1$ is the pressure drop, $t$ is the wall thickness and $\mu$ is the viscosity of the gas.

Referring now to the drawings, the installation represented in FIG. 1 comprises three superposed sections: a heating section 1, a section 2 for imparting a curvature to the glass sheets and a cooling section 3. These three sections are carried by a support structure 4.

The heating section 1 comprises a furnace 5 of a construction known per se. It comprises, for example, an outer casing 6 formed of iron plates and an interior refractory lining 7 having cavities in which heating elements 8 are accommodated. The heating elements are electrical resistance heaters. In the bottom of the furnace there is a slot 9 through which a glass sheet can pass from the furnace into section 2 of the installation.

At section 2 there is means of a kind well known per se for bending the glass sheets, this means comprising a male former 10 and a female former 11. Relative approach and separation movements of these formers are controlled by jacks 12 and 13 fixed to the support structure 4.

The cooling section 3 comprises a fluidisation vessel 14 mounted on a support plate 15. This support plate is provided with rolls 16 which allow the vessel to be moved along a track 17. The vessel 14 has hollow side walls forming a jacket 18 in which a cooling fluid can circulate. This fluid enters and leaves the jacket via pipes 19. The vessel has a flared mouth 20 which helps to prevent any overflow of fluidised particles. At the bottom of the vessel there is a porous wall 21 beneath which is disposed a pressure chamber 22. This chamber has an inlet pipe 23 for the fluidising gas. A mass 24 of fluidised particles is present in the vessel.

A sheet of glass 25 to be curved and tempered is held suspended by tongs 26 of a sheet carrying and transfer mechanism comprising chains 27 which are attached to a driving motor (not shown). These chains extend into the furnace 5 through apertures 28 in its upper part.

The installation is used as follows. A sheet of glass 25 is introduced into the installation at the level of the sheet bending section 2 and is there gripped by the tongs 26. The sheet is then raised into the heating furnace via the aperture 9 under the control of the driving motor for the chains 27.

The sheet is heated to a high temperature by the resistance heaters 8. When the required glass temperature is reached, the sheet 25 is lowered through slot 9 into the bending section 2. The forming dies 10 and 11 are closed onto the heated glass sheet by the jacks 12 and 13 thereby bending the sheet of glass to the required curvature. After opening of the dies, the now curved sheet is lowered into the cooling section in which the mass 24 of solid particles has already been brought into fluidised state by fluidising gas which ascends into the fluidisation vessel 14 from pressure chamber 22 through the porous wall 21. The sheet of glass 25 enters the fluidised bed and there undergoes the rapid cooling required for the tempering of the glass. Heat is removed from the fluidised bed by cooling fluid circulating in the jacket 18.

In the graph (FIG. 2) the height H in millimeters of a fluidised bed is plotted against the speed V in cm/sec of the fluidising gas. The resulting bed height/gas velocity curve shows a behavioural characteristic of fluidised beds that with increase of the fluidising gas the initially compact bed undergoes progressive expansion (part A of the curve) until the fluidising gas velocity reaches a certain value but as the gas velocity increases beyond that value the bed partially collapses (part B of the curve). This rise and fall of the bed surface appears as a peak (herein called "expansion peak") in the bed height/velocity curve. The fluidising gas velocity ($V_o$) at which the expansion peak occurs depends on the properties of the fluidised particles. During still further increase in the fluidising gas velocity the bed surface ceases to fall and the bed height stabilizes. The bed remains fairly stable over a certain gas velocity range but above that range fluidised particles are carried off from the bed.

The following are examples of the performance of a process according to the invention using an installation as above described with reference to FIG. 1.

EXAMPLE 1

The particles of the fluidised layer or bed 24 (FIG. 2) were particles of trihydrated alumina. The particles were between 40 and 120 microns in size, the mean dimension of the particles being 52 microns. The porous wall 21 was constituted by Class 03 Poral sintered bronze, of a thickness of 4.7 mm. The permeability coefficient of such a wall is $0.4 \times 10^{-11}$ m² and the size of the pores of this wall is less than 2 microns. The area of the fluidised bed was 54 dm².

The graph forming FIG. 1 records the height variation in function of gas velocity of a fluidised bed of particles of trihydrated alumina. The expansion peak in the case of this bed occurs at 0.48 cm/sec. When using such bed for carrying out a glass cooling process the fluidising gas velocity is preferably maintained above 0.48 cm/sec (and preferably above 0.5 cm/sec) but preferably not more than $1.2 \times 0.48 = 0.576$ cm/sec.

The pressure chamber 22 was fed with air under a pressure of the order of 8,338.5 Pascals. The air flow used to fluidise the layer of alumina particles was 10 m³/h corresponding to a fluidising gas velocity of just over 0.5 cm/sec.

Sheets of glass 50×30 cm in size and 3 mm in thickness were successively subjected to the bending and tempering operations. Each sheet of glass, after being hung from the tongs 26, was introduced into the furnace 5 and kept there for 3 minutes, the furnace being at a mean temperature of about 720° C. During that period of time, the sheet reached a temperature of the order of 700° C. to 710° C. It was then transferred to the bending section where it was shaped by the forming dies 10 and 11. The sheet remained between the closed dies for about one second. The sheet was then lowered at a speed of 25 m/min into the fluidised bed of trihydrated alumina particles the bed being at ambient temperature. The sheet of glass remained in the fluidised bed for 6 seconds. During this time the glass sheet was rapidly cooled and became thermally tempered. After its extraction from the bed the sheet was cooled to ambient temperature.

The tempered glass sheets, after being bent and tempered, were examined and tested to assess their form and optical quality, and to determine their degree of tempering and their breakage characteristics.

The sheets were found to be substantially free from deformation. The maximum deviation from the ideal form was 0.9 mm measured at the middle of the longer sheet edges, and 1.3 mm measured at the middle of the shorter edges. The glass sheets were of a high optical quality suitable for automobile windscreens.

The sheets were also very adequately tempered for use in automobile windscreens. The tensile stresses in the central part of the sheet thickness, measured by a micropolariscope, was 68.67 N/mm$^2$.

The sheets were broken in order to determine whether they passed a recognised standard test. The test requires a sheet to be broken by the impact of a pointed hammer against a central region of the sheet and specifies conditions concerning the resulting fragmentation of the sheet, ignoring a circular area 150 mm in diameter and centred at the point of impact, and ignoring a 2 cm wide margin of the sheet. The sheet satisfies the standard if there are at least 40 fragments per 5 cm$^2$ in the zones where what appear to be the largest fragments are present, and if there are not more than 350 fragments per 5 cm$^2$ in the zones where what appear to be the smallest fragments are present. The curved glass sheets which had been tempered in this example of the process according to the invention fully satisfied this standard. The minimum number of fragments per 50×50 mm zone in the largest fragment regions of the broken sheets was 67 and the maximum number of fragments per 50×50 mm zone in the smallest fragment regions was 156.

Glass sheets 2.8 and 2.1 mm in thickness were also tempered by a process according to the foregoing example but with heating times in the furnace of 160 and 130 seconds respectively. The sheets were found to be of a similarly high quality with regard to form, optical quality and breakage characteristics.

EXAMPLE 2

Figure 2:
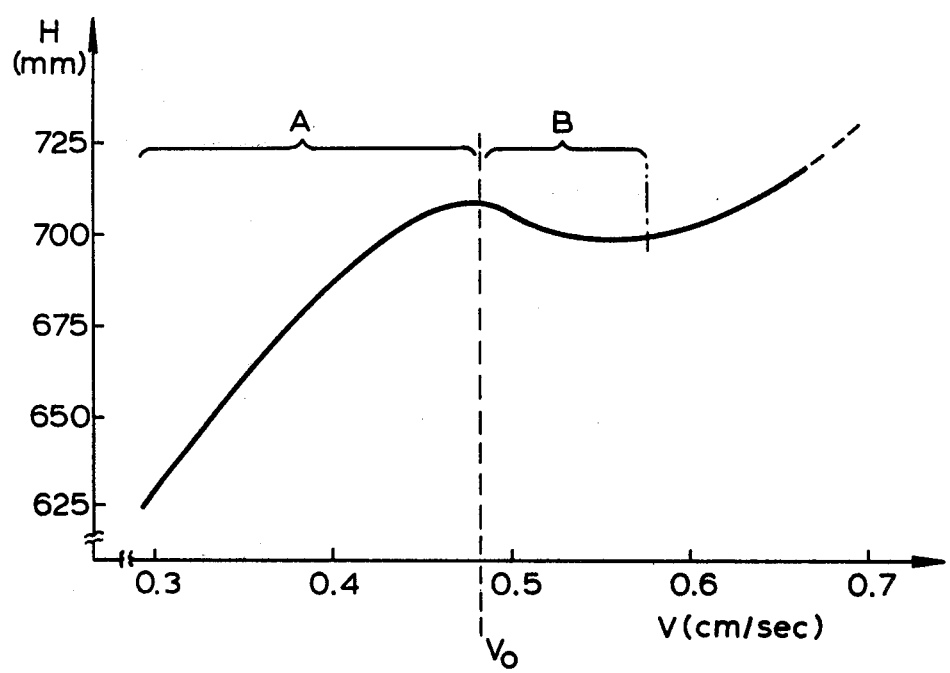
FIG. 2 is a graph showing a characteristic variation of height of a fluidised bed with increase in the velocity of the fluidising gas.

The installation shown in FIG. 2 was used for thermally tempering flat sheets 60×60 cm and 2.65 mm in thickness but without using the bending section 2 of the installation. The other conditions of treatment were similar to those in Example 1. After heating of the sheets in the furnace 5, they were immersed in the fluidised bed 24 of particles of trihydrated alumina.

The tempered glass sheets were found to be still flat and to be of very good optical quality and their breakage characteristics satisfied the standard test above described. The glass sheets were suitable for use in motor vehicle windows.

EXAMPLE 3

Glass sheets identical with those used in Example 2 were tempered using the same process conditions as in that example except that water was introduced into the fluidised bed so as to be present during the period of immersion of the different sheets in the bed and the sheets were preheated in furnace 5 to different temperatures. It was found that when the cooling is effected with water present in the fluidised bed, the sheets need not be pre-heated in furnace 5 to as high a temperature in order to reach the same tempering standard as that attained in Example 2.

EXAMPLE 4

The installation according to FIG. 1 was used for thermally tempering a sheet of float glass, 3 mm thick and 400×300 mm in size.

The sheet was brought to a temperature of 680° C. in the furnace 5. When it has reached this temperature, it was directly transferred to the fluidised bed 24. The sheet bending section 2 was not used. The speed of immersion of the sheet in the fluidised layer was 20 cm/second. The duration of immersion was 15 seconds. The solid particles were constituted by trihydrated alumina. The particulate size distribution was as follows:

| Size of particles (micro-meters) | % of the whole |
| --- | --- |
| 40 to 63 | 56 |
| 63 to 100 | 32 |
| 100 | 12 |

Air was used as the following gas. The air entered the fluidised bed through a porous wall 21 of 03 Poral sintered bronze, 4 mm thick. The size of the pores of the wall were less than 2 microns and its permeability was 0.04×10$^{-11}$ m$^2$.

The calculated upward speed of the air in the fluidised later was 0.8 cm/second.

When subjected to the breakage characteristic test specified in Example 1 it was found that in the largest fragment zones there were over 40 fragments per 5 cm$^2$ and in the smallest fragment zones there were less than 350 fragments per 5 cm$^2$.

Furthermore, the sheet of glass showed no trace of deformation or surface damage.

EXAMPLE 5

Various flat sample pieces of glass of a size of 75×15 mm were thermally tempered using an installation similar to that represented in FIG. 1 but without a sheet bending section.

The furnace 5 was disposed directly over the vessel 14 containing the fluidised bed of solid particles. The latter was constituted by hydrargillite with a particle size range of 40 to 150 microns. The porous wall 21 was constituted by a plate of Poral 30 sintered bronze, 4 mm thick. The permeability of such a plate is of the order of 5×10$^{-11}$ m$^2$ and the maximum size of the pores is 50 microns.

The temperature of the samples of glass at the time of their introduction into the fluidised layer was 685° C.

Samples 2 mm thick were thermally tempered, using air as fluidising gas.

For a calculated upward speed of air through the fluidised layer of 1.7 cm/sec, the maximum tensile stress in the internal layers of glass, measured with a micropolariscope, was 56.9 N/mm$^2$. For a calculated air speed of 3.4 cm/sec, this tensile stress was 59.8 N/mm$^2$.

By way of comparison, samples of the same size were treated in a similar way, but by replacing the hydrargillite by calcined alumina of a particle size range of 100 to 200 microns. For a fluidising air speed of 4.2 cm/sec. the measured tensile stress in the internal layers of glass was only 45.1 N/mm$^2$. Consequently, to obtain a sufficient central tensile stress, it would be necessary to work with such higher fluidising gas speeds that the sheets of glass in the plastic state would be likely to be deformed because of the greater forces.

In another comparative test, the solid particles of the fluidised bed were constituted by sand, 100 to 200 microns in size. The calculated speed of the fluidising gas was 7.6 cm/sec. which resulted in an internal tensile stress in the glass sheets of 39.2 N/mm$^2$. Under these conditions there was significant risk of deformation of the sheets.

EXAMPLE 6

Fluidised beds of hydrargillite, of calcined alumina and of sand as used in Example 5 were used to thermally temper samples of glass sheets of the same sizes as in that example, but 3 mm thick.

Using hydrargillite, the internal tensile stress achieved was 65.7 N/mm$^2$ for an upward speed of the fluidising gas of 1.6 cm/sec.

A fluidising gas speed of 4.3 cm/sec. had to be reached to obtain an internal tensile stress of 54.9 N/mm$^2$ when using calcined alumina. In order to obtain a stress of 52.9 N/mm$^2$ when using sand, the required fluidising gas speed was 7.6 cm/sec.

EXAMPLE 7

The process of the invention was applied for tempering glasses of much greater thickness than those used in the earlier examples.

Fluidised beds of hydrargillite, of calcined alumina and of sand as used in Example 4 were used to thermally temper samples of glass 6 mm thick and measuring 75×15 mm.

With a calculated upward fluidising gas speed of 2.4 cm/sec. using particles of hydrargillite, the internal tensile stress obtained by the tempering operation was 74.5 N/mm$^2$. When using calcined alumina, an internal tensile stress of 68.6 N/mm$^2$ with a gas speed of 2.9 cm/sec. When using sand a stress of 59.8 N/mm$^2$ was attained with a fluidising gas speed of 4.3 cm/sec.

From this example, it is evident that the differences in the results of the fluidised layer are less pronounced than for glasses of lesser thicknesses.

EXAMPLE 8

Flat test pieces of glass of 75×15 mm and 2 mm thick were treated in an installation such as that represented in FIG. 1, but without the sheet bending section. The furnace was disposed directly above the fluidised bed.

The fluidised bed of solid particles was constituted by particles of silica gel of the size range 100 to 200 microns. The particles had a water content of about 19%. The calculated fluidising gas (air) speed was of the order of 1.4 cm/sec. The test pieces, after having been brought to a temperature of the order of 680° C. in the furnace were immersed in the fluidised bed for a time of less than 10 seconds.

The tensile stress set up in the internal glass layers of the samples was 39.2 N/mm$^2$.

EXAMPLE 9

Flat samples of glass of 75×15 mm and 2 mm thick were thermally tempered, in an installation as used in Example 5.

The fluidised bed of solid particles was formed of activated alumina, 50 to 160 microns in size. The porous wall 21 was constituted by a plate of Poral 30 sintered bronze, 4 mm thick.

For a calculated fluidising air speed of 2.4 cm/sec. the internal tensile stress in the glass reached 44.1 N/mm$^2$. For a calculated speed of 1.6 cm/sec., this stress was 42.1 N/mm$^2$.

Tests made with the same fluidised bed, but with samples of glass 3 mm thick led to the following results. For a calculated fluidising gas speed of 2.2 cm/sec., the internal tensile stress obtained was 54.9 N/mm$^2$. For a speed of 1.4 cm/sec., the stress reached was 52.9 N/mm$^2$.

In a variant, helium was used as fluidising gas instead of air, to treat the 2 mm thick sheets. Internal tensile stresses of the order of 41.2 N/mm$^2$ could be measured for a calculated fluidising gas speed of 1.1 cm/sec.

In the various instances, it is possible to apply to the fluidised bed a vibratory movement of low amplitude at a frequency between 50 and 8,000 Hz.

What is claimed is:

1. A process for cooling glass comprising: introducing the glass into a fluidised bed of particles under thermal conditions such that heat is transferred from the glass to the fluidised material, wherein said fluidised material comprises solid particles which can be caused to undergo endothermic change by heating said particles to a temperature lower than the temperature of the glass as it enters the fluidised bed, and wherein at least some of said solid particles are particles of trihydrated alumina, activated alumina containing adsorbed or absorbed water in an amount of 20 to 30% by weight, α-Fe$_2$O$_3$.H$_2$O, or γ-Fe$_2$O$_3$.H$_2$O.

2. A process according to claim 1, wherein the temperature range through which the glass is cooled in the fluidised bed and the rate of said cooling is such that the glass is thermally tempered.

3. A process according to claim 1 or 2, wherein said particles, when caused to undergo a said endothermic change, leave a particulate residue.

4. A process according to claim 1 wherein the particles are particles of α-Fe$_2$O$_3$.H$_2$O or γ-Fe$_2$O$_3$.H$_2$O.

5. A process according to claim 1 or 2, wherein at least some of the fluidised particles are particles of trihydrated alumina.

6. A process according to claim 5, wherein the particles of trihydrated alumina are between 40 and 150 microns in size.

7. Process according to claim 5, wherein said particles of trihydrated alumina comprise hydrargillite or bayerite.

8. A process according to claim 1 or 2, wherein at least some of the said fluidised particles are particles comprising substances with adsorbed or absorbed water.

9. A process according to claim 8, wherein at least some of said fluidised particles are particles comprising said activated alumina.

10. A process according to any of claims 1 or 2 wherein said fluidised material consists essentially of particles in the size range 20 to 250 microns.

11. A process according to any of claims 1 or 2, wherein the velocity of the fluidising gas is above the value corresponding with the expansion peak on the bed height/gas velocity curve but not more than 1.2 times that value.

12. A process according to claim 11, wherein said velocity of the fluidising gas is at least 1.03 times the value corresponding with said expansion peak.

13. A process according to any of claims 1 or 2 wherein said fluidised bed of particles is subjected to a vibratory movement of low amplitude.

14. A process according to any of claims 1 or 2 wherein the fluidising gas enters the fluidised bed through a porous wall of which the pores are less than 60 microns in size.

15. A process according to claim 14 wherein said pores are less than 10 microns in size.

16. A process according to claim 15 wherein said pores are less than 5 microns in size.

17. A process according to any of claims 1 or 2 wherein the fluidising gas enters said fluidised bed through a porous wall whose permeability coefficient does not exceed $6 \times 10^{-11}$ m$^2$.

18. A process according to claim 17 wherein said permeability coefficient is less than $0.25 \times 10^{-11}$ m$^2$.

19. A process according to claim 18 wherein said permeability coefficient is less than $0.05 \times 10^{-11}$ m$^2$.

20. A process according to any of claims 1 or 2 performed for tempering a sheet of glass not more than 3 mm in thickness.

21. Glass cooled by a process according to any of claims 1 or 2.

* * * * *